W. L. BLISS.
SYSTEM OF ELECTRICAL DISTRIBUTION.
APPLICATION FILED AUG. 4, 1904.
1,040,496.
Patented Oct. 8, 1912.
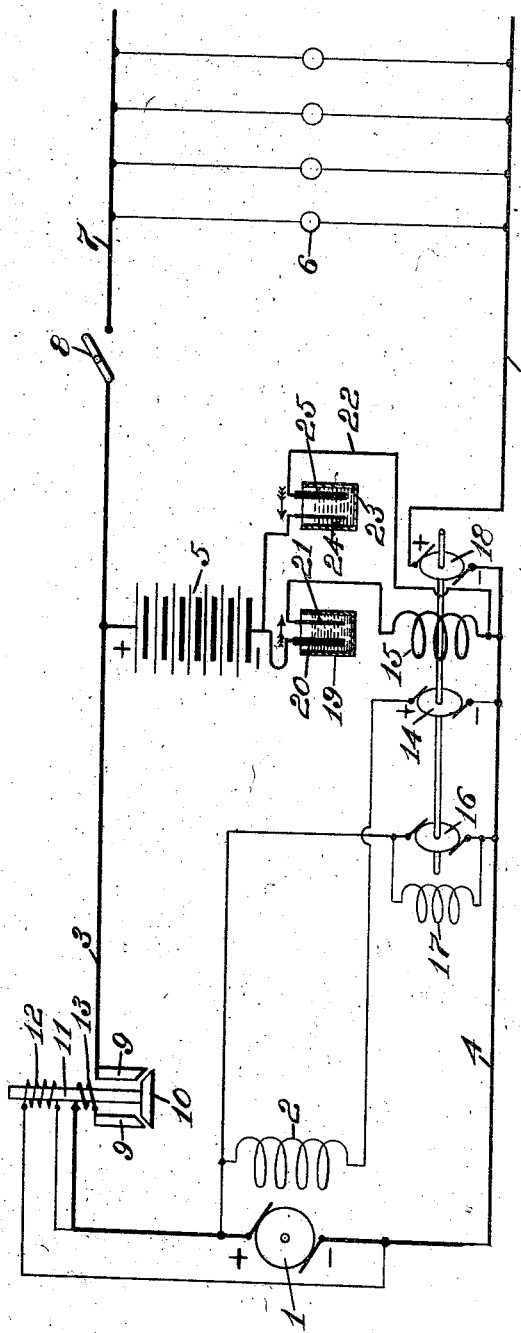
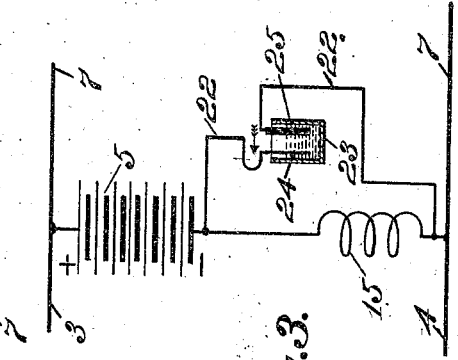
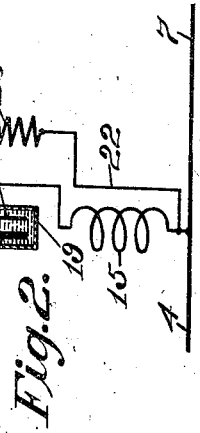
WITNESSES:
Herbert J. Smith
Edwin B. H. Tower, Jr.
INVENTOR.
William L. Bliss
BY Jones & Addington
ATTORNEYS.

UNITED STATES PATENT OFFICE.

WILLIAM L. BLISS, OF NEW YORK, N. Y., ASSIGNOR, BY MESNE ASSIGNMENTS, TO THE UNITED STATES LIGHT AND HEATING COMPANY, OF NEW YORK, N. Y., A CORPORATION OF MAINE.

SYSTEM OF ELECTRICAL DISTRIBUTION.

1,040,496.      Specification of Letters Patent.      Patented Oct. 8, 1912.

Application filed August 4, 1904. Serial No. 219,461.

*To all whom it may concern:*

Be it known that I, WILLIAM L. BLISS, a citizen of the United States, residing at New York, in the county of Kings and State of New York, have invented new and useful Improvements in Systems of Electrical Distribution, of which the following is a full, clear, concise, and exact description, reference being had to the accompanying drawing, forming a part of this specification.

My invention relates to improvements in systems of electrical distribution, and although it is particularly adapted for lighting cars or trains by electricity it may be applied to other purposes.

In the lighting of cars or trains by electricity, a system has been employed wherein the current for operating the lamps and other translating devices of the system is furnished from a generator which derives its power from the motion of the car or train and a storage battery which receives its charging current from the generator, said generator being regulated by means of a suitable automatic regulator to confine the voltage developed thereby within certain limits notwithstanding the excessive variations in the speed thereof.

The current which the generator must deliver to operate the translating devices and also charge the battery depends upon the current being consumed by the translating devices, as the current consumed by the translating devices varies upon changing the number of translating devices in operation. Therefore, the generator must be capable of varying its output whenever the number of translating devices in operation is changed, so as to insure sufficient current being delivered to the battery to charge the same.

The subject of the present invention is to provide a system for lighting cars or trains by electricity wherein the regulator will not interfere with the ability of the generator to vary its output upon variations in the demands for current by the translating devices.

In the usual form of a system of car or train lighting such as has been herein characterized, the storage battery and the translating devices are located in separate circuits which are suitably connected with the generator. In accordance with the present invention in its preferred form, the regulator for the generator is connected with the battery circuit to receive current for controlling the operation thereof from the generator and has associated therewith an electrolytic valve adapted to prevent current from said battery from affecting the action of the same.

The generator may be regulated by a regulator of any form so far as the ultimate results are concerned, but in the preferred form of the present invention, I prefer to employ for this purpose a counter electromotive force device which introduces a counter electro-motive force into the field circuit of the generator to oppose the current tending to flow therethrough and thereby reduce the energizing current of said field as the speed of the generator increases. The field strength of the generator thus being weakened as the speed of the generator rises, the output of the generator remains within prearranged limits.

In order to explain my invention I shall describe the system which is illustrated in the accompanying drawing. It will, of course, be understood that the drawing merely outlines several features of the system to set forth my invention. The several views in said drawing are as follows:

Figure 1. is a diagrammatic view of a system embodying the features of the present invention, and Figs. 2. and 3. illustrate other ways of attaining the ends of the present invention.

In the system illustrated in the drawings there is employed a generator having an armature 1 and a field 2, said armature being geared to an axle or in any other way arranged so as to derive the power for operating the same from the motion of the car or train.

The generator sends currents through a supply circuit 3—4 to a storage battery 5 arranged in one parallel branch of said supply circuit, and also to translating devices 6—6 arranged in another parallel branch 7—7 of said supply circuit. The translating circuit 7—7 is preferably provided with a switch 8 by means of which the circuit of the translating devices may be opened and closed.

The supply circuit may be controlled by an automatic switch which may consist of stationary contacts 9, 9 and a movable contact 10 adapted to bridge said stationary contacts and carried by a plunger 11, said plunger being operated by a solenoid 12 of fine wire connected in a shunt across the supply circuit. When the automatic switch is closed, a solenoid 13 of coarse wire connected in series with the switch contacts in the supply circuit supplements the action of the shunt solenoid to effect closer engagement between the switch contacts as the current flowing through the switch from the generator increases. The automatic switch is closed by the shunt solenoid when the generator runs at sufficient speed to develop a certain voltage, and when the switch is closed the series solenoid is energized. While the generator voltage remains in excess of the battery voltage, the series solenoid is energized by current from the generator and then the two solenoids act conjointly in keeping the switch closed, but when the generator voltage falls below the battery voltage, the series solenoid becomes energized by current from the battery flowing backward therethrough and then, as the two solenoids oppose each other in action, due to the reversal of the polarity of the series solenoid, the switch opens and stops the discharge of the battery through the generator.

The generator may be regulated to confine the voltage developed thereby within certain limits by a counter electro-motive force device having an armature 14 connected in series with the field 2 of the generator and a field or controlling magnet 15 connected in the battery circuit, said armature preferably being driven in starting by a shunt wound motor connected across the mains of the supply circuit and having an armature 16 and a field 17. When the generator becomes operative and delivers current to the battery, the field 15 of the counter electro-motive force device becomes excited by current flowing through the battery circuit, and the armature thereof runs at substantially constant speed. The strength of the field or controlling magnet of the counter electro-motive force device will increase as the voltage developed by the generator increases, since the increase in the generator voltage will cause the current flowing through the battery circuit to charge the battery to increase in proportion to the increase in the voltage impressed at the terminals of the battery circuit. As the resulting increase in the strength of the field or controlling magnet 15 will cause the counter electro-motive force created in the field circuit of the generator to increase, the current flowing through the field of said generator will be reduced and the field of the generator thereby weakened. The field strength of the generator thus being varied approximately inversely as the speed thereof varies, the output will remain within safe and certain limits notwithstanding the extent to which the speed may rise. Assuming that when the car or train runs at about 20 miles per hour, the generator runs at 500 revolutions per minute and develops 64 volts, then when the car or train runs at about 60 miles per hour, provided all other conditions remain the same the generator would run at about 1500 revolutions per minute, and if its field were not weakened by the counter electro-motive force device, would develop about 192 volts. It is sufficient under these conditions to have the generator develop 80 volts at the maximum speed of the car as this would be approximately 2½ volts per cell, which is ample to force the full charging current through the battery, where the battery contains 32 cells each having a normal voltage of 2 volts. Accordingly, the generator may be regulated to allow a variation in the voltage developed by the generator from 64 to 80 volts while the speed of the generator varies from about 500 revolutions per minute at a car speed of 20 miles per hour to 1500 revolutions per minute at a car speed of about 60 miles per hour.

The counter electro-motive force device being connected with the battery circuit, it will not interfere with the ability of the generator to vary its output upon variations in the demands for current by the translating devices. Consequently, the current for charging the battery will remain substantially constant at constant speed of the generator, for when the demands for current by the translating devices vary the output of the generator will vary accordingly, that is, assuming that the battery receives 15 amperes and the translating devices consume 20 amperes, thus making the total current delivered by the generator 35 amperes, then should the current being consumed by the translating devices be increased to 35 amperes, the output of the generator would increase to 50 amperes so as to leave 15 amperes for charging the battery as before.

An advantage which arises from maintaining constant current for charging the battery at constant speed of the generator, is that where the car or train runs upon a certain schedule, it is possible to insure sufficient current being delivered to the battery to compensate for all the demands which may be made upon the battery by the translating devices.

The counter electro-motive force device may be provided with a second armature 18 which is connected in the translating circuit 7—7 in series with the translating devices and driven by the same motor in starting and excited by the same field as the armature 14. When the field or controlling magnet 15 of the counter electro-motive force device becomes excited, a counter electromotive force will be introduced into the translating circuit from the armature 18 to oppose the voltage the generator tends to impress upon said circuit, said counter electro-motive force being in proportion to the current flowing through said magnet. As the curent flowing through said magnet will increase in proportion to the voltage at the terminals of the battery circuit, the counter electro-motive force introduced into the translating circuit will increase in proportion to the rise in the voltage at the terminals of the battery circuit when the battery is being charged, it always being equal to the excess in the voltage developed by the generator above the normal voltage. Therefore, the voltage impressed upon the translating devices will remain constant irrespective of the rise in voltage upon the battery circuit, coincident with charging the battery, and as the internal resistance of the armature 18 is comparatively low, said counter electro-motive force will be independent of the number of translating devices in operation.

After the motor serves the purpose of starting the counter electro-motive force device and the counter electro-motive force device becomes operative, the motor will then be relieved of its load, as the electrical energy received or absorbed by said device from the translating circuit and also from the field circuit of the generator tends to operate said device. At this stage in the operation of said device and said motor, the motor becomes a generator while the counter electro-motive force device becomes a motor, and under these conditions a large portion of the energy consumed in operating said device is restored to the system by the motor which now acts as a generator it being driven by said device.

Although it is preferable to have the counter electro-motive force device for regulating the generator and the counter electro-motive force device for modifying the voltage impressed upon the translating circuit a unitary device, it is obvious that the same may be separate entities and that either one may be employed without the other.

As the current which the battery discharges to operate the translating devices flows through the battery circuit in an opposite direction to the current which the generator sends through said circuit to charge the battery, if the current discharged from the battery were allowed to flow through the field or controlling magnet 15, said magnet would be excited with such polarity that the counter electro-motive force device would reverse its function if it were in operation, and then instead of a counter electro-motive force, a direct electro-motive force would be introduced into the field circuit of the generator and also into the translating circuit. Moreover, where the regulators for the generator and the lamps assume other forms than that illustrated herein, various other effects which should be avoided would follow, if the current from the battery were allowed to affect the operation of the regulators to any appreciable extent. Therefore, the current which the battery discharges may be prevented from flowing through the field or controlling magnet 15 of the counter electro-motive force device by an electrolytic valve 19 which may consist of a plate of iron 20 and a plate of aluminum 21, said plates being immersed in a solution of bi-carbonate of soda or other suitable material contained within a suitable cell or receptacle and electrically connected with each other through the solution only. Around the controlling magnet 15 and the electrolytic valve 19 may extend a by-pass or shunt 22 having located therein an electrolytic valve 23 which may have a plate of aluminum 24 and a plate of iron 25, said plates being immersed in a suitable solution like the plates of the other electrolytic valve. As the electrolytic valves will prohibit current from flowing therethrough save when the polarity of the current is such that the current may enter the valve by the iron plate, and thence after flowing through the solution leave the valve by the aluminum plate, the current which the battery discharges will be prevented from flowing through the field or controlling magnet 15, although the current from said battery may flow from the positive terminal of the battery through the switch 8, conductor 7, translating devices 6, conductor 7, armature 18, and shunt 22 having valve 23, to the negative terminal of the battery. However, the current which the generator sends through the battery to charge the same may flow through the field or controlling magnet 15 but not through the shunt 22, the course which said current follows being from the positive terminal of the generator, through the automatic switch, conductor 3, battery 5, valve 19, magnet 15, and main 4, to the negative terminal of the generator.

In Figs. 2. and 3. are suggested other embodiments of the present invention in which electrolytic valves are employed with results similar to those obtained in the system which has already been set forth.

According to the scheme illustrated in Fig. 2. a resistance 26 may be arranged in the shunt 22 instead of an electrolytic valve. The generator may then send current from the supply mains 3 through the battery 5, valve 19, and magnet 15, to the supply main 4, said current being prevented from flowing through the shunt 22 to any great extent by the resistance 26, but the current which the battery discharges will be prohibited by the valve 19 from flowing through the field or controlling magnet 15, and consequently it must flow through the shunt.

The scheme illustrated in Fig. 3. discards the valve 19 but retains the valve 23 in the shunt around the controlling magnet. With this arrangement the current which the generator sends through the battery may flow from the supply main 3 to the battery 5 and controlling magnet 15 to the supply main 4, although it will be prevented from flowing through the shunt 22 by the valve 23, but the current which the battery discharges may return through the shunt and thus be diverted from the field or controlling magnet 15.

It is obvious from the illustrations which are made herein that an electrolytic valve may be employed in various ways in accordance with the present invention to prevent the current discharged by the battery from affecting the operation of the regulator for the generator.

While the car is at rest the translating devices may be operated by current from the battery 5, the circuit from said battery through the translating devices being completed from the positive terminal of the battery, through the switch 8, conductor 7, translating devices 6, conductor 7, armature 18, and shunt 22 having valve 23, to the negative terminal of the battery. When the car runs at sufficient speed to develop, for instance, 64 volts, the automatic switch will be closed, and then if the voltage developed by the generator and that of the storage battery are substantially equal, the generator and the battery will coöperate in supplying the current for operating the translating devices, the current from the battery flowing through the course which has just been traced while the current from the generator flows from the positive terminal of the generator through the automatic switch, supply main 3, switch 8, conductor 7, translating devices 6, conductor 7, armature 18, and supply main 4, to the negative terminal of the generator. If the voltage developed by the generator becomes higher than the voltage of the battery, the generator will supply current for charging the battery as well as for operating the translating devices, and then the battery will cease to discharge current and the current from the generator will flow from the positive terminal of the generator, through the automatic switch, supply main 3, thence dividingly through the battery 5, valve 19, field or controlling magnet 15, and also through switch 8, conductor 7, translating devices 6, conductor 7, and armature 18, and thence, after reuniting in supply main 4, return to the negative terminal of the generator. The generator needs to be regulated only when the voltage developed thereby rises higher than the battery voltage, and then current flows from the generator through the battery circuit, thereby causing the counter electro-motive force device to be operative.

It will be understood that many changes may be made in the system which has been particularly set forth without in any way deviating from the spirit of my invention as defined in the claims appended hereto.

Having thus described my invention, what I claim as new and desire to secure by Letters Patent, is:—

1. In a system of electrical distribution, in combination, a suitable source of electrical energy, a battery adapted to be charged from said source, translating devices adapted to be operated by said source or said battery, a counter electro-motive force device for modifying the electrical conditions in said system and having its field connected in the battery circuit, and an electrolytic valve arranged to keep the current from said battery from affecting the action of said counter electro-motive force device.

2. In combination, a suitable source of electrical energy, a battery adapted to be charged from said source, translating devices adapted to be operated either by said source or said battery, a counter electro-motive force device for regulating said source and having its field connected in the battery circuit, and an electrolytic valve arranged to keep current from said battery from affecting the action of said counter electro-motive force device.

3. In combination, a generator, a storage battery adapted to be charged thereby, translating devices adapted to be operated either by said generator or said storage battery, a counter electro-motive force device having a field or controlling magnet connected in the circuit of said battery, and an electrolytic valve arranged to prohibit current from said battery from flowing through said magnet.

4. In combination, a generator, a main circuit extending therefrom and divided into two parallel branches, one including the storage battery and the other the translating devices, a regulator, an electromagnetic winding for controlling said regulator, said winding being arranged in said battery branch circuit, a shunt circuit extending around said winding, an electrolytic valve arranged in said shunt circuit and adapted to prevent current from said generator from flowing through said shunt circuit.

5. In combination, a generator, a storage battery adapted to be charged thereby, translating devices adapted to be operated either by said generator or said storage battery, a counter electro-motive force device for regulating said generator and having a field or controlling magnet connected in the circuit of said battery, a shunt extending around said magnet, and an electrolytic valve arranged to prohibit current from said generator from flowing through said shunt.

6. In combination, a generator, a storage battery adapted to be charged thereby, translating devices adapted to be operated either by said generator or said storage battery, an automatic regulator having a controlling or operating magnet connected in the circuit of said battery, an electrolytic valve adapted to prohibit current from said battery from flowing through said magnet, and a shunt or by-pass extending around said magnet and said valve, and an electrolytic valve arranged to prohibit current from said generator from flowing through said shunt.

7. In combination, a generator, a storage battery adapted to be charged thereby, translating devices adapted to be operated either by said generator or said storage battery, a counter electro-motive force device having a field or controlling magnet connected in the circuit of said battery, an electrolytic valve adapted to prohibit current from said battery from flowing through said magnet, and a shunt or by-pass extending around said magnet and said valve, and an electrolytic valve arranged to prohibit current from said generator from flowing through said shunt.

8. In combination, a suitable source of electrical energy tending to develop a variable electro-motive force, a storage battery adapted to be charged thereby, an automatic switch connected in circuit with said elements, translating devices adapted to be operated either by said source or said storage battery, a counter electro-motive force device for modifying the electro-motive force impressed upon said translating devices by said source, and an electrolytic valve arranged to keep the current from said battery from affecting the action of said counter electro-motive force device.

9. In combination, a generator tending to develop a variable electro-motive force, a storage battery adapted to be charged thereby, translating devices adapted to be operated either by said generator or said storage battery, automatic means for modifying the electro-motive force impressed upon said translating devices by said generator and having a controlling or operating magnet connected with said battery circuit, a shunt extending around said means, and an electrolytic valve arranged to prohibit current from said generator from flowing through said shunt.

10. In combination, a generator tending to develop a variable electro-motive force, a storage battery adapted to be charged thereby, translating devices adapted to be operated either by said generator or said storage battery, a counter electro-motive force device for modifying the electro-motive force impressed upon said translating devices by said generator and having a field or controlling magnet connected with said battery circuit, a shunt extending around said magnet, and an electrolytic valve arranged to prohibit current from said generator from flowing through said shunt.

11. In combination, a generator tending to develop a variable electro-motive force, a storage battery adapted to be charged thereby, translating devices adapted to be operated either by said generator or said storage battery, a counter electro-motive force device for modifying the electro-motive force impressed upon said translating devices by said generator and having a field or controlling magnet connected in the battery circuit, and an electrolytic valve arranged to prohibit current from said battery from flowing through said magnet.

12. In combination, a generator tending to impress a variable electro-motive force, a storage battery adapted to be charged thereby, translating devices adapted to be operated either by said generator or said storage battery, automatic means for modifying the electro-motive force impressed upon said translating devices by said generator and having a controlling or operating magnet connected with said battery circuit, an electrolytic valve adapted to prevent current from said battery from flowing through said magnet, a shunt extending around said valve and said magnet, and an electrolytic valve arranged to prohibit current from said generator from flowing through said shunt.

13. In combination, a generator tending to impress a variable electro-motive force, a storage battery adapted to be charged thereby, translating devices adapted to be operated either by said generator or said storage battery, a counter electro-motive force device for modifying the electro-motive force impressed upon said translating devices by said generator and having a field or controlling magnet connected with said battery circuit, an electrolytic valve adapted to prevent current from said battery from flowing through said magnet, a shunt extending around said valve and said magnet, and an electrolytic valve arranged to prohibit current from said generator from flowing through said shunt.

14. In combination, a generator tending to impress a variable electro-motive force, a storage battery adapted to be charged thereby, translating devices adapted to be operated either by said generator or said storage battery, automatic means for regulating said generator to confine the electro-motive force developed thereby within certain limits and to modify the electro-motive force impressed upon said translating devices by said generator, said means having a controlling magnet connected in the battery circuit, and an electrolytic valve arranged to keep current from said battery from affecting the action of said means.

15. In combination, a generator tending to impress a variable electro-motive force, a storage battery adapted to be charged thereby, translating devices adapted to be operated either by said generator or said storage battery, automatic means for regulating said generator to confine the electro-motive force developed thereby within certain limits and to modify the electro-motive force impressed upon said translating devices by said generator, said means being provided with a controlling magnet connected with the battery circuit, a shunt extending around said magnet, and an electrolytic valve arranged to prevent current from said generator from flowing through said shunt.

16. In combination, a generator tending to impress a variable electro-motive force, a storage battery adapted to be charged thereby, translating devices adapted to be operated either by said generator or said storage battery, automatic means for regulating said generator to confine the electro-motive force developed thereby within certain limits and to modify the electro-motive force impressed upon said translating devices by said generator, said means being provided with a controlling magnet connected with the battery circuit, an electrolytic valve adapted to prohibit current from said battery from flowing through said magnet, a shunt extending around said valve and said magnet, and an electrolytic valve arranged to prohibit current from said generator from flowing through said shunt.

17. In combination, a generator tending to impress a variable electro-motive force, a storage battery adapted to be charged thereby, translating devices adapted to be operated either by said generator or said storage battery, a counter electro-motive force device having an armature connected in the field circuit of said generator and an armature connected in the circuit of said translating devices, the field or controlling magnet of said counter electro-motive force device being connected in said battery circuit, and an electrolytic valve arranged to prohibit current from said battery from flowing through said magnet.

18. In combination, a generator tending to impress a variable electro-motive force, a storage battery adapted to be charged thereby, translating devices adapted to be operated either by said generator or said storage battery, a counter electro-motive force device having an armature connected in the field circuit of said generator and an armature connected in the circuit of said translating devices, the field magnet of said counter electro-motive force device being connected in said battery circuit, a shunt extending around said magnet, and an electrolytic valve arranged to prevent current from said generator from flowing through said shunt.

19. In combination, a generator tending to impress a variable electro-motive force, a storage battery adapted to be charged thereby, translating devices adapted to be operated either by said generator or said storage battery, a counter electro-motive force device having an armature connected in the field circuit of said generator and an armature connected in the circuit of said translating devices, the field or controlling magnet of said device being connected in said battery circuit, an electrolytic valve adapted to prohibit current from said battery from flowing through said magnet, a shunt extending around said valve and said magnet, and an electrolytic valve arranged to prohibit current from said generator from flowing through said shunt.

20. In a system of electrical distribution, in combination, a generator tending to develop a variable electro-motive force, a storage battery and translating devices arranged in circuit therewith, automatic means operatively arranged in circuit to modify the voltage impressed upon said translating devices according to the current delivered to said storage battery, and an electrolytic valve for preventing said means from being subjected to reversals of current.

21. In a system of electrical distribution, in combination, a generator tending to develop a variable electro-motive force, a storage battery and translating devices arranged in circuit therewith, a dynamo electric machine operatively arranged in circuit to regulate said generator, means for controlling the action of said machine according to the current delivered to said storage battery, and an electrolytic valve for preventing said means from being subjected to reversals of current.

22. In a system of electrical distribution, in combination, a generator tending to develop a variable electro-motive force, a storage battery and translating devices arranged in circuit therewith, a dynamo electric machine operatively arranged in circuit to regulate said generator, means for controlling the action of said machine according to the current delivered to said storage battery, a by-pass or shunt extending around said means, and an electrolytic valve arranged in said by-pass.

23. In a system of electrical distribution, in combination, a generator, a storage battery and translating devices arranged in circuit therewith, a counter electro-motive force device operatively arranged in circuit to modify the voltage impressed upon said translating devices, electromagnetic means arranged in circuit to control the action of said counter electro-motive force device according to the current sent through said storage battery, a by-pass or shunt extending around said means, and an electrolytic valve arranged in said shunt or by-pass.

In witness whereof, I have hereunto subscribed my name in the presence of two witnesses.

WILLIAM L. BLISS.

Witnesses:
 EDWIN B. H. TOWER, Jr.,
 J. N. ROBERTSON.